United States Patent [19]

Dornheim et al.

[11] Patent Number: 4,457,959

[45] Date of Patent: Jul. 3, 1984

[54] PROCESS FOR FINISHING FISHING NETS

[75] Inventors: Gotmar Dornheim; Edmund Giez, both of Leichlingen, Fed. Rep. of Germany

[73] Assignee: Bayer Aktiengesellschaft, Leverkusen, Fed. Rep. of Germany

[21] Appl. No.: 243,232

[22] Filed: Mar. 13, 1981

[30] Foreign Application Priority Data

Mar. 26, 1980 [DE] Fed. Rep. of Germany ....... 3011710

[51] Int. Cl.³ .............................................. B05D 3/02
[52] U.S. Cl. ........................................ 427/379; 43/7; 87/1; 427/381; 427/389.9
[58] Field of Search ...................... 427/379, 381, 389.9, 427/393.5, 434.6, 421, 430.1; 428/255; 422/6; 43/7; 28/169; 87/1

[56] References Cited

U.S. PATENT DOCUMENTS

| | | | |
|---|---|---|---|
| 2,590,586 | 3/1952 | Thompson et al. | 43/7 |
| 3,017,292 | 1/1962 | Mosher | 428/255 |
| 3,032,441 | 5/1962 | Beaumont et al. | 428/255 |
| 3,050,820 | 8/1962 | Pamm | 427/393.5 |
| 3,853,599 | 12/1974 | Kamichika et al. | 427/393.5 |
| 3,888,805 | 6/1975 | Van Gils et al. | 427/393.5 |
| 3,951,723 | 4/1976 | Wright | 427/393.5 |

*Primary Examiner*—S. L. Childs
*Attorney, Agent, or Firm*—Sprung, Horn, Kramer & Woods

[57] ABSTRACT

Crimping of fishing nets, particularly of the codends of fishing nets of synthetic filamentary yarn, to be subjected to severe mechanical stressing, can be considerably avoided by impregnating the nets with finish consisting of a mixture of a vinyl pyridine copolymer latex, a formaldehyde resin precondensate, formaldehyde, water and, optionally, a dye, drying the nets thus impregnated and subsequently subjecting the nets to a heat treatment at 130° C. to 180° C.

8 Claims, No Drawings

PROCESS FOR FINISHING FISHING NETS

This invention relates to a process for finishing fishing nets to be subjected to severe mechanical stressing, particularly the tail ends of fishing nets, for example so-called codends of synthetic filament yarns. The finish provided by the process according to the invention considerably avoids crimping of the net meshes.

Crimping is understood to be the shrinkage or contraction of the twisted, braided or warpknitted mesh sides. In general, two factors are responsible for the contraction of the meshes, namely the shrinkage inherent in the material and the shrinkage caused by roughening of the meshes, for example due to looping of the individual filaments. The mesh sizes reduced through contraction of the meshes come up against the regulations of the North Atlantic Fishery Commissions (NEAFC and ICNAF) who have prescribed minimum mesh sizes for avoiding over-fishing. Nets in which contraction due to crimping is taken into account by providing the nets with larger meshes are not accepted by fishermen because they give rise to smaller catches. Moreover, crimping is also a source of damage to fishing nets and results in their premature wear.

Fishing nets are produced either by knitting twisted or braided synthetic filament yarns or by warpknitting synthetic filament yarns (knotless nets). Knitting is followed by a so-called setting process. As a result of setting or thermosetting, for example in hot air, boiling water, saturated steam or hot oil, a large proportion of the shrinkage previously present is removed from the net material, depending on the setting conditions and the setting medium, and the stability of the knots tied in the net is simultaneously improved. Fine to medium fishnets are occasionally finished with a knot fixing agent. These fixing agents are stiffening and adhesive preparations, for example solutions of silica, dispersions of vinyl acetate or vinyl chloride, which are intended to improve knot-stability and which are applied either by spraying or by immersion, followed by drying.

In the case of net ends of coarse, strong netting, which are subsequently exposed in use to severe mechanical abrasive stressing, for example as a result of sliding over the ground, attempts have hitherto been made to solve the problem of wear by coating the netting with bitumen, polyvinyl chloride or latex after stretching and/or thermofixing. However, the disadvantage of such aftertreatments is that the coatings can only delay the onset of crimping for a short time. As soon as the outer coating of the meshes has been worn away, crimping and hence contraction of the meshes begin in consequence of the exposed individual filaments of the twisted or braided yarn.

The materials generally used for fishing nets are polyamide, polyethylene, polypropylene or polyester filament yarns or blends thereof, preferably polyamide filament yarn.

The object of the present invention is to avoid mesh-crimping by providing a finishing process for fishing nets of the above-mentioned materials, particularly for net ends and the like, which is suitable both for unset and also for set nets because not all net makers subject their nets to thermosetting. Apart from this, almost every net maker sets his nets differently and, as a result, also obtains a different setting effect.

It has now been found that crimping can be substantially avoided providing the nets are impregnated with a finish consisting of a mixture of a vinyl pyridine/copolymer latex, a formaldehyde resin precondensate, formaldehyde, water and, optionally, dye, the nets thus impregnated are dried and then subjected to a heat treatment at a temperature in the range from 130° C. to 180° C. In the case of nets which have already been thermoset, the finish is applied after the thermosetting operation. The latex/resin mixture may be applied by dip coating, splash coating or spray coating. The finish penetrates into the twines or braided yarns of the nets and, after condensation, ensures that each single filament remains in the position it has assumed, thereby preventing as well contraction of the twines or braided yarns as penetration of sand.

Suitable formaldehyde resin precondensates are for example soluble precondensates of ureas, melamines and phenols with formaldehyde, preferably a precondensed resorcinol/formaldehyde resin.

Suitable comonomers for the vinyl pyridine/copolymer latex are, in particular, butadiene and styrene. The latex/resin mixture may be prepared such that the nets do not undergo any unfavourable hardening.

The coating (expressed as dry matter) should be applied in a quantity of from 5 to 20% by weight and preferably in a quantity of from 12 to 15% by weight, based on the weight of the dry, non-finished netting.

The degree to which the finish penetrates into the filament yarns and the quantities of dry matter applied may be adjusted by adapting the dry matter content of the impregnating solution to the raw materials which have not always been uniformly prepared. Undesirable hardening which can occur where the dry matter content is increased may be counteracted by making the increase in the latex component only and leaving the quantity of resin unchanged. This measure makes processing very safe by ensuring adequate pot lives.

Mixtures of the following composition are used for impregnation:

|     | Parts by weight | |
| --- | --- | --- |
|     | liquid | solid |
| (a) vinyl pyridine copolymer latex, 40% aqueous solution | 250–900 | 100–360 |
| water | 60–0 | — |
| dye | x | x |
| (b) resorcinol/formaldehyde resin, 40% aqueous solution | 50 | 20 |
| water | 250 | — |
| formaldehyde, 30% aqueous solution | 20 | 6 |

The mixture has a dry matter content of from about 20 to 30%.

Components (a) and (b) of the mixture are separately premixed, after which component (b) is slowly stirred into component (a).

Impregnation is followed by drying at a temperature in the range from room temperature up to 120° C. The drying times range from about 10 minutes to 2 hours, longer drying times being required for lowering drying temperatures. Drying is complete when the material is no longer tacky. After drying, the coating is condensed to completion by heating to 130° C.–180° C. over a period of from 1 to 10 minutes. Standard commercial products, for example PYRATEX J 1904[1], are used as the vinyl pyridine copolymer latex. Standard commercial resorcinol/formaldehyde resins are also used, for example VULKADUR T[2]. The vinyl pyridine pyridine copolymer latex may contain other constituents, for example up to 50% of styrene/butadiene rubber latex (SBR latex).

(1)PYRATEX J 1904 is a copolymer latex of butadiene/styrene and vinyl pyridine with a vinyl pyridine content of 13.5%; Manufacturer: BAYER U.K. Ltd., Latex Production Division, Bromsgrove.
(2)VULKADUR T is a product of Bayer AG, Leverkusen.

Since the actual mechanical stresses to which codends are subjected during fishing are determined by numerous factors, the actual conditions are very difficult to reproduce for test purposes. Thus, it has been found that the results of abrasion tests depend to a very large extent upon the particular test apparatus used. There is no internationally accepted and standardised test. However, experience has shown that reproducible results and, at the same time, severe mechanical stressing of net material can be obtained if test specimens, for example net meshes, are placed in a box measuring approximately 30×20×20 cm filled with a qualitatively and quantitatively defined mixture of coarse gravel, fine gravel, sand and seawater. This so-called crimp tested is rotated for 3 hours about a centrally mounted shaft fixed to both sides. After a certain number of revolutions at a uniform speed in the crimp tester, net threads, cords and meshes which have not been finished in accordance with the invention show signs of contraction and a change for the worse in their appearance. The degree of contraction is measured and expressed as a percentage by comparison with the test specimen before the treatment, whilst the appearance of the test specimens is marked. The test results depend on the constituent material (polyamide, polyethylene, etc.) of the test specimen, on whether the material is twisted or braided and on the configuration, thermosetting and finish of the meshes.

Some empirical values are shown below in dependence upon the degree of stressing in the crimp tested (maximal values):

The crimp tester described hereinbefore was filled with 300 cc of sand, 300 cc of fine gravel (particle size 3-12 mm) 350 cc of coarse gravel (particle size 12-30 mm), 1500 cc of water and 45 g of common salt and rotated for 3 hours at 60 revolutions per minute.

| Non-set polyamide twines without any anti-crimp finish | up to 35% contraction |
| Non-set polyamide braided lines without any anti-crimp finish | up to 18% contraction |
| Polyamide twines set with saturated steam without any anti-crimp finish | up to 20% contraction |
| Polyamide braided lines set with saturated steam without any anti-crimp finish | up to 12% contraction |

EXAMPLE

Codend with doubled, braided mesh sides (one side of Perlon filament yarn 1880 dtex/4/16) is set with saturated steam for 15 minutes at 130° C. in an autoclave after evacuation for 10 minutes (no shrinkage being allowed). After this process and after the net has cooled sufficiently on the tenter frame outside the autoclave, the net is removed from the autoclave and treated for 10 minutes in an impregnating solution consisting of:
700 parts by weight of Pyratex J 1904, 40%;
1 part by weight of a black pigment;
50 parts by weight of Vulkadur T , 40%;
250 parts by weight of water; and
20 parts by weight of formaldehyde, 30%, subsequently dried in hot air and then condensed for 5 to 10 minutes in air heated to 150° C. Thereafter, the solids applied amount to 14%.

This codend has a mesh width when wet of 120 mm. After 3 hours in a crimp tester, the wet mesh width is still 120 mm. The meshes do not show any signs of mechanical wear. The mesh widths were measured by the spring-loaded mesh gauge of the International Council for the Exploration of the Sea.

With net ends made of twisted Perlon filament yarn, mesh contractions of about 0 to 2% are observed after the same treatment. Accordingly, with nets such as these, the meshes need only be made 2% larger.

Basically, non-set net ends may also be treated equally successfully with the anti-crimp finish according to the invention. In this case, however, the following factors have to be taken into consideration:

(a) due to the absence of thermosetting and simultaneous stressing, the knots are not tight which affects mesh width and has to be compensated in advance by the appropriate input of material;

(b) the mesh width of the unfixed net will decrease accordingly on account of the shrinkage both in cold water and in hot air of the polyamide material (caused by the water present in the finishing material and by the drying process and the condensation process). This also has to be compensated in advance by the appropriate input of material.

All transitions from inadequately fixed material, from thermofixed to non-thermofixed material may be correspondingly treated.

We claim:

1. A process for finishing fishing nets, comprising impregnating the fishing nets, with a finish consisting of a mixture of a vinyl pyridine copolymer latex, a formaldehyde resin precondensate, formaldehyde, water and, optionally, a dye, drying the nets thus impregnated and subsequently subjecting the nets to a heat treatment at 130° C. to 180° C.

2. A process as claimed in claim 1, comprising fishing nets consisting of twisted or braided synthetic filament yarns.

3. A process as claimed in claim 1, comprising fishing nets consisting of twisted or platted synthetic polyamide filament yarns.

4. A process as claimed in claim 1, comprising using a precondensed resorcinol/formaldehyde resin as the formaldehyde resin precondensate.

5. A process as claimed in claim 1, comprising using a mixture of 250 to 900 parts by weight of vinyl pyridine copolymer latex in the form of a 40% aqueous solution, 250 to 310 parts by weight of water, 50 parts by weight of resorcinol/formaldehyde resin in the form of a 40% aqueous solution and 20 parts by weight of formaldehyde in the form of a 30% aqueous solution for impregnation.

6. A process as claimed in claim 1, comprising vinyl pyridine copolymer latex containing up to 50% of SBR latex.

7. A process as claimed in claim 1, comprising solids applied in the coating amounting to between 5% and 20% by weight, based on the weight of the dry, non-finished netting.

8. A process as claimed in claim 1, comprising a drying time in the range from 10 minutes to 2 hours and effecting condensation of the components of said mixture for a condensation time in the range from 1 to 10 minutes.

* * * * *